United States Patent [19]

Frentzen et al.

[11] 4,033,568

[45] July 5, 1977

[54] EDGE WORKING MACHINE WITH HOLD DOWN FOR SHEET METAL TO BE WORKED

[75] Inventors: Hermann Josef Frentzen, Rheydt; Gerhard Hendrix, Stolberg; Manfred Huppertz, Monchengladbach; Hans Georg Ritter, Rheydt; Fritz Wittek, Viersen, all of Germany

[73] Assignee: Mannesmann Aktiengesellschaft, Dusseldorf, Germany

[22] Filed: Nov. 19, 1976

[21] Appl. No.: 743,237

[30] Foreign Application Priority Data

Dec. 5, 1975 Germany .................... 2555325

[52] U.S. Cl. .................... 269/26; 269/258
[51] Int. Cl.² .................... B23Q 3/08
[58] Field of Search .............. 269/25, 26, 153, 258, 269/265, 267; 83/458, 390

[56] References Cited

UNITED STATES PATENTS 3,054,316  9/1962  Pearson .................... 269/26

*Primary Examiner*—Harold D. Whitehead
*Assistant Examiner*—Robert C. Watson
*Attorney, Agent, or Firm*—Ralf H. Siegemund

[57] ABSTRACT

A hold down device is disclosed suitable for an edge planing machine for working sheet metal. The hold down device has a plurality of hold down elements arranged in the direction of movement of the sheet metal and in a laterally overlapping relation. A plurality of piston cylinder units are provided and a single hydraulic cylinder is associated with and connected to each element for pressing it down against the sheet metal to be worked. The lateral surfaces of the elements facing the plate edge are in alignment with each other. The piston rod of the hydraulic drives are connected to the middle of each element for swivel action. The individual elements may either have an essentially rhomboidal or Z-shaped plan view. A further improvement adds spring forces and guidance to the hold down action.

4 Claims, 6 Drawing Figures

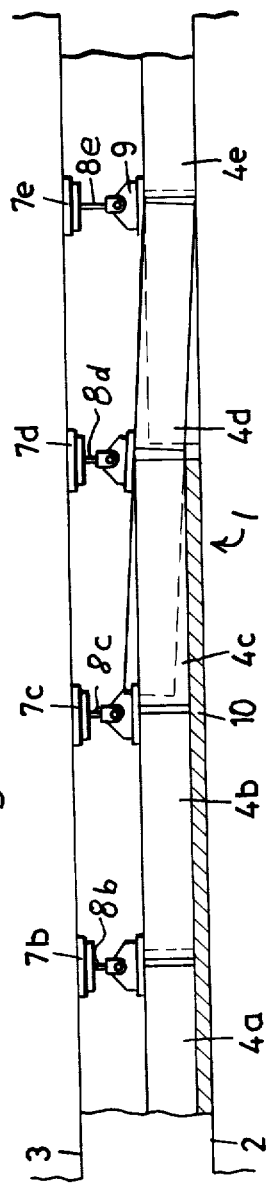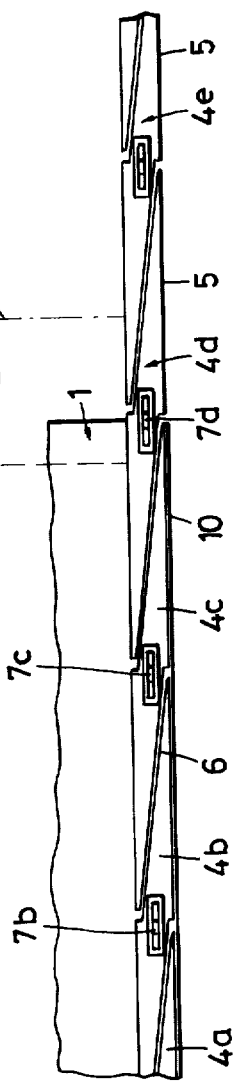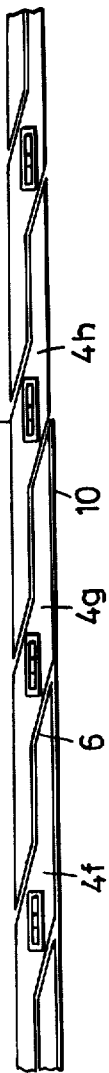

EDGE WORKING MACHINE WITH HOLD DOWN FOR SHEET METAL TO BE WORKED

BACKGROUND OF THE INVENTION

The present invention relates generally to edge working machines for working sheet metal and particularly relates to the construction of a hold down device for such machines.

The careful working of the edges of sheet metal or a plate is one of the most important steps in the process for the manufacture of large pipes. The quality of the working of the plate edges is an optimum when the sheet metal is clamped as close as possible to the edge to be worked upon its support. For this purpose it is known to provide a plurality of hydraulic cylinders which, in turn, have plate-shaped or disk-shaped hold down devices at the end of each piston facing the metal plate. Furthermore, it is known to provide a plurality of hold down beams along the edge, and each beam is pressed upon the metal plate, sheet, etc., by two cylinders.

The invention relates specifically to improvements of such a hold down device having several elements such as beams. The known hold down beam is actuated by means of two cylinders having a point of contact in the region of the ends of the beam. The two cylinders can only be fully loaded when the hold down beam rests with its entire length upon the plate. However, usually plates or sheets of different lengths must be worked. Therefore, the danger exists that a plate or sheet metal, when introduced into the edge working (planing) machine, is not securely clamped at one or the other or even both of the end regions. This is particularly disadvantageous when, as happens frequently, the sheet metal plate at the end portion not securely clamped in capable of lifting slightly from the base.

SUMMARY OF THE INVENTION

It is accordingly an object of the present invention to provide a hold down device for an edge working machine in such a manner that regardless of the length of the plate or sheet metal, even the end regions of the plate are securely clamped.

In accordance with the preferred embodiment of the present invention, the hold down device includes a plurality of laterally overlapping hold down elements, and hydraulic drives are associated with the elements, each drive being journalled to the middle of the respective element. Due to the overlap, a first portion of each element at its side opposite the plate edge to be worked is disposed adjacent the preceding element while the second half or portion of each element at the side facing the plate edge to be worked is disposed adjacent the succeeding element.

According to one embodiment, the hold down elements have essentially a rhomboidal plan view and the diagonal thereof has a ratio of 15 to 1. According to another embodiment of the invention, the elements have an approximately Z-shaped plan view.

In accordance with the invention with the simplest means it is achieved that a sheet clamped into the edge planing machine is always secured or clamped along its entire length.

The hydraulic installation is relieved or made more economical by a further improvement of the invention. Two guide bolts having differentially disposed end stops are connected to the associated guidance means of the frame. Each guide bolt is associated with a preloaded compression spring which is effective between the element and the frame. The entire spring force of the two springs associated with each element is smaller than the return force of the corresponding hydraulic cylinder.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a sectional, side elevational view of a hold down device for working sheet metal in accordance with the invention;

FIG. 2 is a partial plan view of the device of FIG. 1;

FIG. 3 is a plan view illustrating Z-shaped elements;

Figure 6:
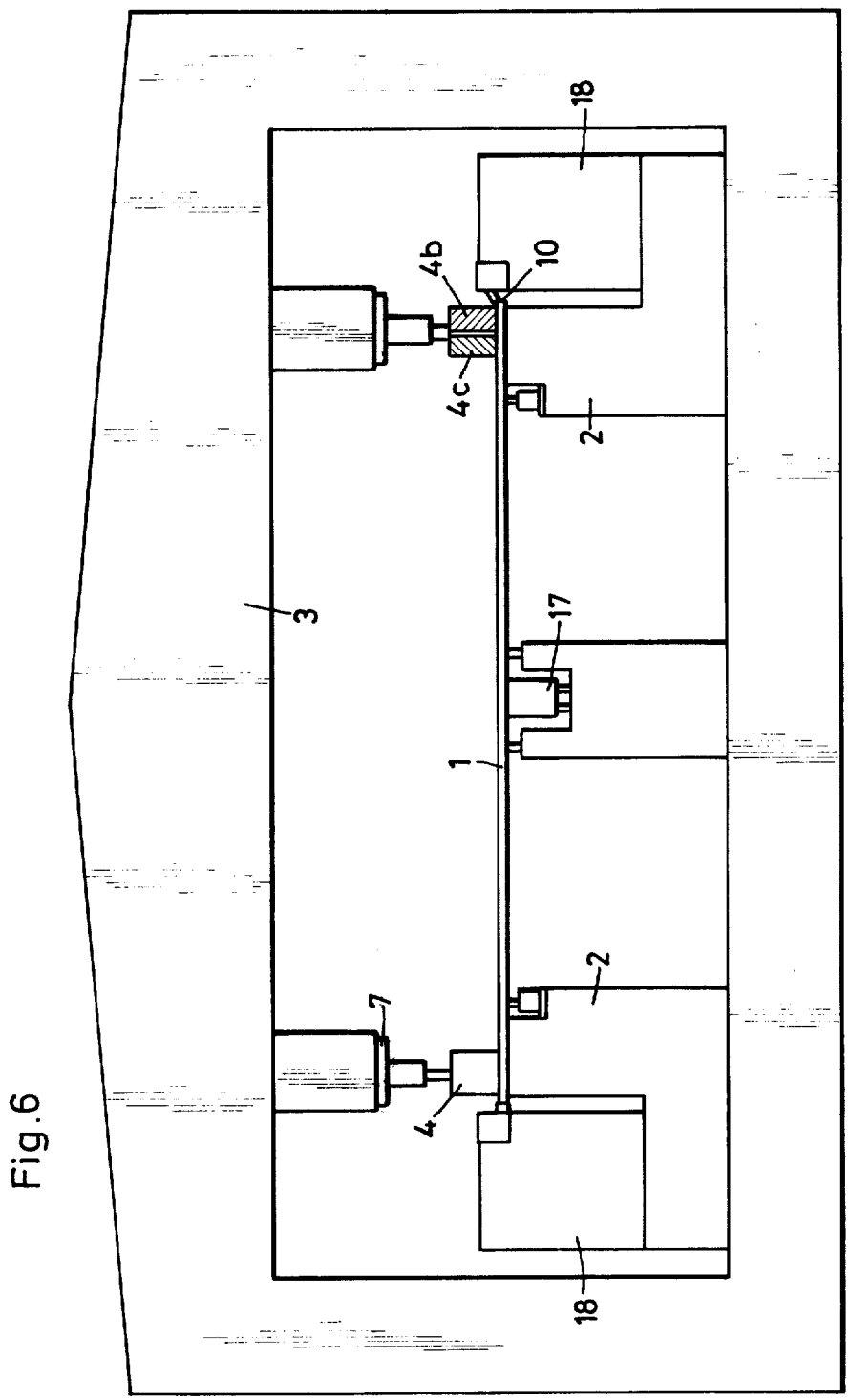
FIG. 6 is a front elevational view of an edge planing machine.

Proceeding now to the detailed description of the drawings, the hold down device in accordance with the preferred embodiment of the invention as shown in FIGS. 1-5 is used in an edge planing machine illustrated in FIG. 6. This machine has a frame 3, a support 2 for a sheet metal 1 to be worked, a hydraulic cylinder 7 for the elements 4, 4b, 4c of the hold down device, as well as a plane 18 which serves the purpose to work the two plate edges. In order to place sheet metal stock 1 into the machine, there are provided electromagnetic towing or dragging devices 17 for moving the sheet stock in a direction transversely to the plane of the drawing.

Referring now to FIG. 1, there is illustrated a device for holding down a sheet metal 1 at the edge planing machine as shown in FIG. 6. The hold down device is secured at the frame 3 of the machine by means of hydraulic cylinders 7b, 7c, 7d and 7e. The hydraulic drives move respectively piston rods 8a through 8e. The hold down device itself includes the several elements 4a, 4b, 4c, 4d and 4e which are shown in FIG. 2 in laterally overlapping relation, but they do not influence each other as to the respective forces acting upon them. In other words, each hold down element can (as to the plane of FIGS. 2 or 3) move freely up and down, but the motion and position is controlled by the respective hydraulic drive. The elements may, for example, be of essentially rhomboidal plan view as shown in FIG. 2 or else they may be Z-shaped as shown in FIG. 3. In FIG. 3 the elements are designated 4f, 4g and 4h.

The hydraulic cylinder 7b is associated with the element 4b and the hydraulic cylinder 7e to the element 4e. By means of the last mentioned association, the connection shall now be explained in more detail. The piston rod 8e of the hydraulic cylinder 7e is pivotally journalled to the element 4a by means of a holding element 9 being rigidly connected to the element 4c.

Front edge of sheet metal 1 as shown in full in FIGS. 1 and 2 is located exactly below the hydraulic cylinder 7d. However, it is not clamped by cylinder 7d, but by the hydraulic cylinder 7c instead, using particularly the holding element 4c which actually extends to the edge of the plate edge 10. If the sheet metal would assume a position shown in dotted lines and identified by 1', the clamping would also take place by means of the element 4c. For a sheet metal that assumes the position 1" shown by the dash dot lines in FIG. 2, the end of the sheet metal is clamped by means of the element 4d. The side face 5 of element 4d faces the sheet edge 10 to be worked and is in line with the side face 5 of the adjacent element 4e as well as with the corresponding sides of all remaining hold down elements.

It will be evident from FIGS. 2 and 3 showing different forms of the hold down elements, that the gap 6 separating them extend from about the middle of each following element back to the middle of each individual element itself.

Figure 4:
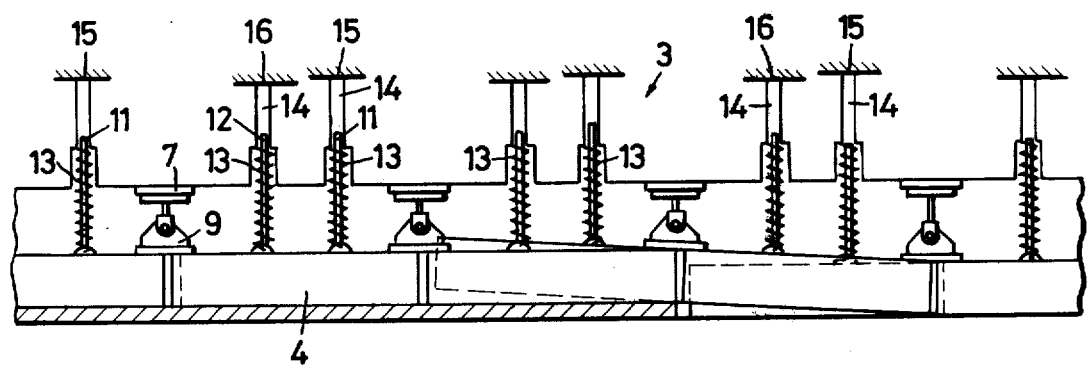
FIG. 4 is a side elevational view illustrating guide bolts and compression springs.
Figure 5:
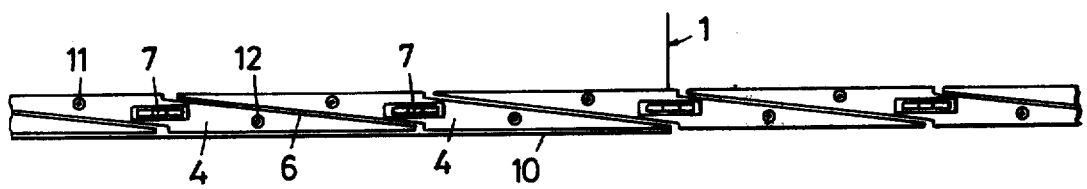
FIG. 5 is a plan view of the device of FIG. 4.

In the embodiment of FIG. 4, each hold down element is provided with two guide bolts 11, 12 having end stops 15, 16 in different positions and being disposed in the associated guides 14 of the frame 3. A preloaded compression spring 13 is associated with each guide pin 11, 12, the pins being disposed between the respective element 4 and frame 5. The common spring force as exerted by the two springs 13 upon the respective element 4 is smaller than the return force of the corresponding hydraulic cylinder 7. The pressure force acting upon one element 4 must be so large that even if the sheet metal is corrugated, the sheet metal is pressed down. Accordingly, in this embodiment the hold down force results from the pressure of the hydraulic cylinder 7 to which is added the force from the two associated springs 13. This means that the hydraulic system is required to produce a lower force and, therefore, its cost is reduced. Furthermore, the hydraulic system is also utilized when the elements 4 must be raised because it then must work against the force of the springs 13.

The differential end stops 15 and 16 assure that each element to be lifted assumes an inclined position so that a metal sheet which moves from left to right as seen in FIG. 4 can never hit the front face of a hold down element.

The invention is not limited to the embodiments described above but all changes and modifications thereof not constituting departures from the spirit and scope of the invention are intended to be included.

We claim:

1. In a machine for working the edges sheet metal, the improvement comprising:
   a. a hold down device having a plurality of elements disposed in and along the direction of extension of the sheet metal edges to be worked, the elements being arranged in overlapping relation so that a first portion of each element at its side opposite the plate edge to be worked being disposed adjacent the preceding element, a second portion of each element at the side facing the plate edge to be worked being disposed adjacent the succeeding element;
   b. a plurality of piston cylinder units, each for pressing down one of said elements against the sheet metal to be worked, the lateral surfaces of all elements facing the plate edge to be worked being in alignment with each other; and
   c. means for pivotally securing the middle of each element to one of the units.

2. Machine as defined in claim 1, the individual elements having an essentially rhomboidal plan view, the diagonals of which have a ratio of about 15 to about 1.

3. Machine as defined in claim 1, wherein the elements have an approximately Z-shaped plan view.

4. Machine as defined in claim 1, wherein a frame is provided, two guide bolts being connected to each element and having different end stops, and a loaded compression spring respectively associated with each guide bolt and effective between the associated element and said frame, the common spring force of the two springs associated with each element being smaller than the return force of the corresponding hydraulic cylinder.

* * * * *